June 4, 1946.  R. O. SHONTS  2,401,517
FISH LINE DRIER
Filed Jan. 6, 1944  2 Sheets-Sheet 1

Raymond O. Shonts
INVENTOR.

BY
Victor J. Evans & Co.
ATTORNEYS

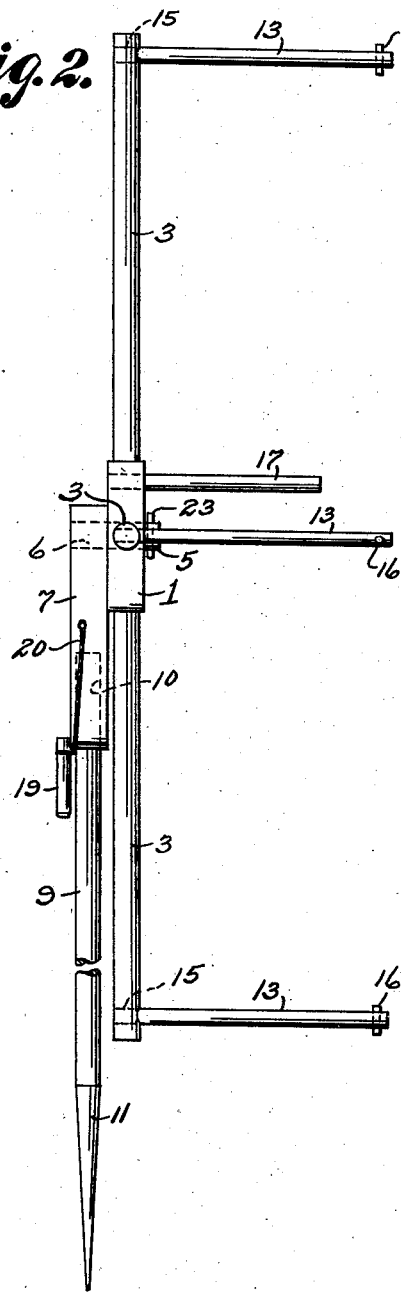
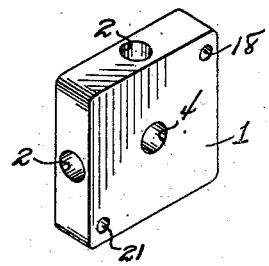
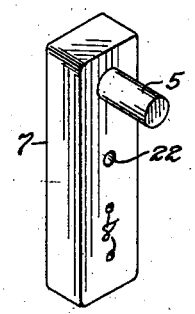
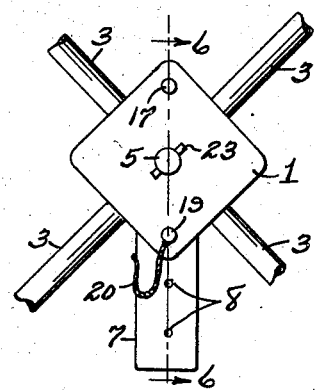
Raymond O. Shonts INVENTOR.
BY Victor J. Evans & Co.
ATTORNEYS Patented June 4, 1946

2,401,517

UNITED STATES PATENT OFFICE 2,401,517

FISHLINE DRIER

Raymond O. Shonts, Horicon, Wis.

Application January 6, 1944, Serial No. 517,257

2 Claims. (Cl. 242—104)

This invention relates to fish line driers and it is one object of the invention to provide a drier which is particularly adapted for drying a line of the type used on fishing rods and prevent the line from rotting due to its not being dried after use.

Another object of the invention is to provide a drier which may be set up for use by thrusting the lower end of its standard into the ground where it will support the line-receiving reel in an elevated position where the line may be easily wound thereon and exposed to air currents for drying the line.

Another object of the invention is to provide a line drier which is very simple in construction and easy to assemble for use, thus permitting the drier to be stored in a knocked-down condition when not in use.

Another object of the invention is to provide a device of this character which is formed entirely of wood, thus eliminating metal parts which would be liable to rust, the device being formed without use of threaded parts and thus allowing it to be easily taken apart as there are no portions which are liable to become jammed from being screwed into place and then swelling.

Another object of the invention is to provide a line drier formed mainly of wooden rods of the type used for dowel pins, thus allowing parts to be readily replaced at small cost if they should be broken.

Another object of the invention is to provide a line drier which may be manufactured and sold at small cost as it consists entirely of wooden rods and blocks.

The invention is illustrated in the accompanying drawings wherein:

Figure 2 is a view in elevation looking from one side of Figure 1.

Figure 3 is a perspective view of the hub-block of the reel.

Figure 4 is a perspective view of the bearing or mounting member which rotatably supports the reel.

Figure 5 is a fragmentary view showing the hub and portions of the arms of the reel together with the mounting member for the reel.

Figure 1:
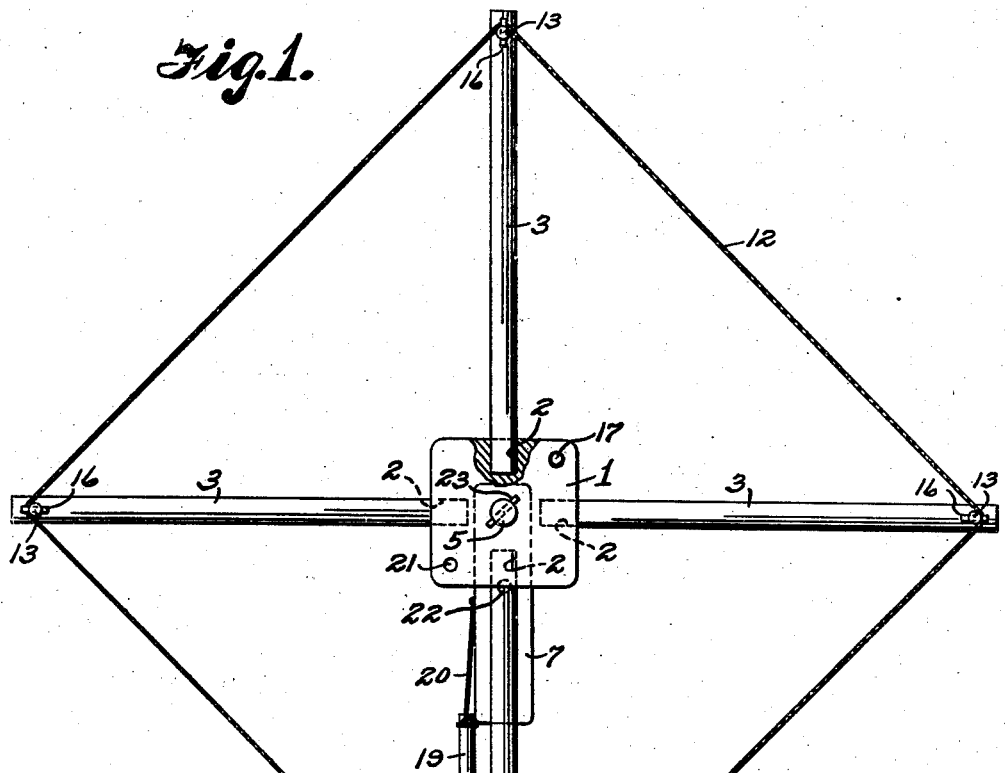
Figure 1 is a view in elevation showing the line drier in use.
Figure 6:
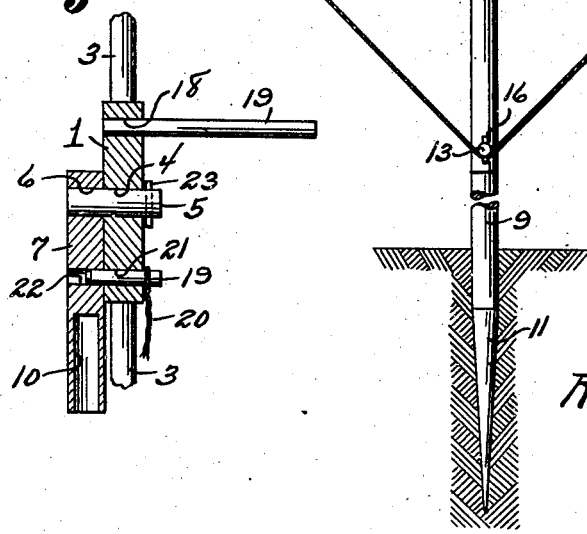
Figure 6 is a sectional view taken along line 6—6 of Figure 5.

This line drier is particularly intended for use as means for drying a fishing line after use and thus prevent deterioration of the line due to being left in wet condition upon a fishing reel. The drier is formed entirely of wood so that there are no parts to corrode or rust and consists briefly of a reel carried by a mounting member which rotatably supports the reel so that the fishing line may be wound upon the reel for drying and then unwound from the drying reel as it is rewound upon the fishing reel. The drying reel has a square hub 1 consisting of a wooden block which may be of any dimensions desired and has its edge faces formed with sockets 2 to receive ends of spokes 3 formed from wooden rods of suitable length and of such diameter that they will fit tightly into the sockets 2. At the center of the hub block 1 is an opening 4 to receive a spindle 5 for rotatably mounting the hub, this spindle being also formed of wood and fitting into an opening or socket 6 formed near the upper end of a mounting member or block 7. The mounting member may be secured against a post or other suitable support by nails passed through openings 8 or it may be supported by a standard 9 consisting of a wooden rod having its upper end fitted into a socket 10 leading from the lower end of the mounting member. The lower end of the standard is tapered, as shown at 11, so that the standard may be easily thrust into the ground and the reel supported above the ground. The line 12 which it is desired to dry is to be wound upon the reel and in order to accommodate the line there have been provided arms 13 which are mounted through openings near outer ends of the spokes and project forwardly therefrom. These arms may be of any desired length and near their outer front ends are formed with openings to receive pins 16 which project from the arms, as shown in Figures 1 and 2, and serve as stops to prevent the line 12 from slipping off outer ends of the arms. Since the arms 13 are of appreciable length the line may be wound upon the reel with portions spaced from each other and thus allow all portions of the line to be exposed to air and quickly dried.

A handle 17 formed from a wooden rod is fitted into an opening 18 formed through the hub block so that the reel may be readily turned to wind line thereon and in order to prevent turning of the reel while a line is drying there has been provided a pin 19 which is carried by a string 20 of such length that the pin may be passed through an opening 21 formed through the hub block 1 and into an opening of socket 22 formed through the mounting block 7 above the openings 8. After the line has dried the pin 19 may be easily withdrawn and the drying reel allowed to turn freely about the spindle 5 as the line is wound upon a fishing reel. A pin 23 which is passed through the outer front end of the spindle prevents the hub block from slipping off the spindle. Since the line drier consists entirely of sections of predetermined length cut from wooden rods of predetermined diameter, with the exception of the two wooden blocks forming the hub of the reel and the mounting block, it will be apparent that the device is formed of material readily obtainable at small cost and the drier may be cheaply manufactured and sold at a reasonable price. It will also be evident that since the drier may be easily assembled and also very easily taken apart, it may be sold in knocked-down condition and also reduced to a knocked-down condition after use and stored in a tackle box.

Having thus described the invention, what is claimed is:

1. A fish line drier comprising a mounting including a block formed with a socket leading from its lower end, a spindle projecting forwardly from said block and having its rear end removably fitted into a socket formed transversely through the upper portion of the block, a hub rotatable upon said spindle and formed with sockets in its marginal edge faces, spokes extending radially from said hub and fitted into the socket thereof, arms extending forwardly from outer ends of said spokes and mounted in sockets formed through the spokes, abutment pins passing through front ends of said arms to prevent line from slipping off the arms, a handle for turning the reel engaged in a socket formed through the hub and projecting forwardly therefrom, said mounting block being formed with an opening through its front and rear faces below the spindle, the hub being formed with an opening for registering with the opening of the mounting block, a pin for removably engaging in the registering openings of the hub and the mounting block to releasably hold the hub against turning about the spindle, and a standard for supporting the mounting block and the reel in elevated position having its upper end removably fitted into the socket leading from the lower end of the mounting block and having its lower end portion tapered to facilitate thrusting the standard into the ground.

2. A fish line drier comprising a mounting including a block formed with a socket leading from its lower edge, a spindle removably supported by the block and extending laterally therefrom, a hub rotatably supported upon the spindle, spokes removably secured in the marginal edge of said hub, arms removably supported by the outer ends of the spokes and extending at right angles thereto, stops removably carried by the outer ends of the arms, a removable handle carried by the outer face of the hub, a pin passing through the hub for locking the same on the mounting against rotation, and a standard removably secured in the socket for supporting the same in an elevated position and constructed to be thrust into the ground.

RAYMOND O. SHONTS.